US012746895B1

(12) United States Patent
Bond et al.

(10) Patent No.: US 12,746,895 B1
(45) Date of Patent: Sep. 29, 2026

(54) WINCH STABILIZER FOR SELF-ANCHORING A WINCHING VEHICLE

(71) Applicants: Randall Chance Bond, Leander, TX (US); Justin Prince, Craig, CO (US)

(72) Inventors: Randall Chance Bond, Leander, TX (US); Justin Prince, Craig, CO (US)

( * ) Notice: Subject to any disclaimer, the term of this patent is extended or adjusted under 35 U.S.C. 154(b) by 319 days.

(21) Appl. No.: 18/648,853

(22) Filed: Apr. 29, 2024

Related U.S. Application Data

(60) Provisional application No. 63/462,584, filed on Apr. 28, 2023.

(51) Int. Cl.
*B60T 3/00* (2006.01)
*B60D 1/58* (2006.01)

(52) U.S. Cl.
CPC . *B60T 3/00* (2013.01); *B60D 1/58* (2013.01)

(58) Field of Classification Search
CPC .............. B60T 3/00; B60D 1/58; B60D 1/185
USPC ...................................................... 188/32, 36
See application file for complete search history.

(56) References Cited

U.S. PATENT DOCUMENTS 5,586,621 A * 12/1996 Moon ........................ B60T 3/00 188/4 R
6,948,734 B2 * 9/2005 Popham .................... B60D 1/38 280/491.1
9,821,616 B1 * 11/2017 Sayers .................... B60D 1/187
10,538,196 B2 * 1/2020 Centerbar ............ A01B 59/062
12,134,869 B1 * 11/2024 Schultz .................. B60D 1/485
2006/0103111 A1 * 5/2006 Popham .................... B60D 1/40 280/478.1
2006/0201980 A1 * 9/2006 Koons ...................... B66D 1/00 254/323
2012/0118680 A1 * 5/2012 Giglio ........................ B60T 3/00 188/32
2018/0092285 A1 * 4/2018 Centerbar ............ A01B 59/062
2018/0222262 A1 * 8/2018 Vetkos ................... B60D 1/185

* cited by examiner

*Primary Examiner* — Thomas W Irvin
(74) *Attorney, Agent, or Firm* — Rick B. Yeager

(57) ABSTRACT

A winch stabilizer assembly comprises an extension plate configured to be mounted in the hitch receiver of a winching vehicle and a pair of rear tire anchors. The anchors are configured to be attached by chain to a pair of lateral extension arms which may be inserted into the extension plate. As a bumper or receiver hitch mounted winch engages an object, the chain connection is tightened, and the anchors provide ground resistance to the winching vehicle. The winch stabilizer assembly components are designed to be quickly assembled, easily manipulated, and utilized without additional tools.

2 Claims, 6 Drawing Sheets

332

WINCH STABILIZER FOR SELF-ANCHORING A WINCHING VEHICLE

This is US non-provisional patent application claims the priority date of U.S. Provisional Patent Application No. 63/462,584 filed Apr. 28, 2023 by applicants.

BACKGROUND—FIELD OF INVENTION

The current invention is for a stabilizer assembly to stabilize a bumper-mounted/receiver hitch mounted winch.

BACKGROUND—PRIOR ART

Conventional winch recovery systems require anchoring to a tree, additional vehicle, or another large stationary anchor point depending on the severity of the situation. The current invention provides a stand-alone system that allows self-anchoring via tire anchors and associated winch stabilization.

SUMMARY

In one embodiment, a winch stabilizer assembly comprises an extension plate configured to be mounted in the hitch receiver of a winching vehicle; and a pair of rear tire anchors. The tire anchors are configured to be attached by chain to a pair of lateral extension arms which may be inserted into the extension plate. As a bumper or receiver hitch mounted winch engages an object, the chain connection is tightened, and the anchors provide ground resistance to the winching vehicle. The winch stabilizer assembly components are designed to be quickly assembled, easily manipulated, and utilized without additional tools.

DETAILED DESCRIPTION

Figure 1:
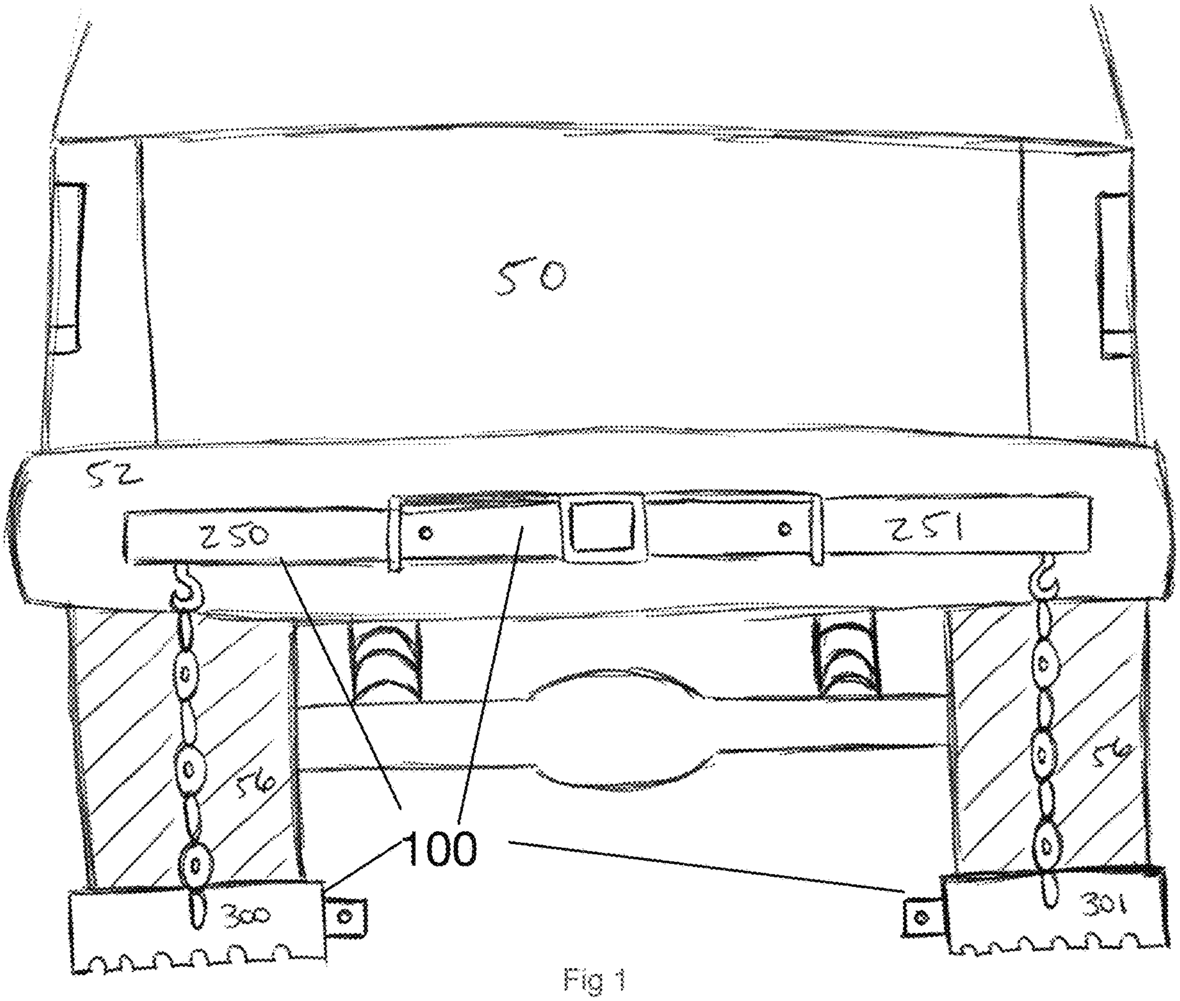
FIG. 1 is a rear view of a winch stabilizer assembly attached to the rear bumper of a vehicle.

The following element numbers are provided for convenience in reviewing the figures.

- winching vehicle 50
  - rear bumper 52
    - receiver 54
    - D ring shackle 55
  - rear tires 56
- winched object (recovered vehicle) 60
- bumper mounted winch 70
  - winch line 72
  - movable snatch block/alternate receiver hitch winch mounting location 74
  - fixed snatch block 76
- Winch Stabilizer Assembly 100
- Extension Plate 200
  - top plate 210
  - cross brace 220
    - longitudinal bar 230
      - vehicle receiver connection 232
        - receiver pin 234
    - lateral bar 240
      - extension receivers 242
  - extension arms 250, 251
    - proximal end 252
    - distal end portion 254
      - chain hook 256
- tire anchors 300, 301
  - rear plate 310
    - chain attachment (weld) 312
    - bottom edge 320
      - notches 322
  - inside side plate 330
    - square tubing 332
      - pin holes 334
  - outside side plate 340
  - top plate 350
  - hollow interior 360
- anchor connecting tube 400
  - anchor plate attachment pin holes 410
    - anchor plate pins 412

FIG. 1 is a rear view of a winch stabilizer assembly 100 attached to the rear bumper 52 of a vehicle 50. This figure shows the system completely assembled and its functionality when installed. In this example, the Winch stabilizer assembly 100 attaches via square tubing receiver hitch and pinning system receiver compatible with a hitch mounted winch or accessory. FIG. 1 visually represents a typical configuration of the winch stabilizing system, and the interaction between the tire anchors 300 and 301; extension arms 250 and 251; and the cross-bracing unit 220.

Figure 2:
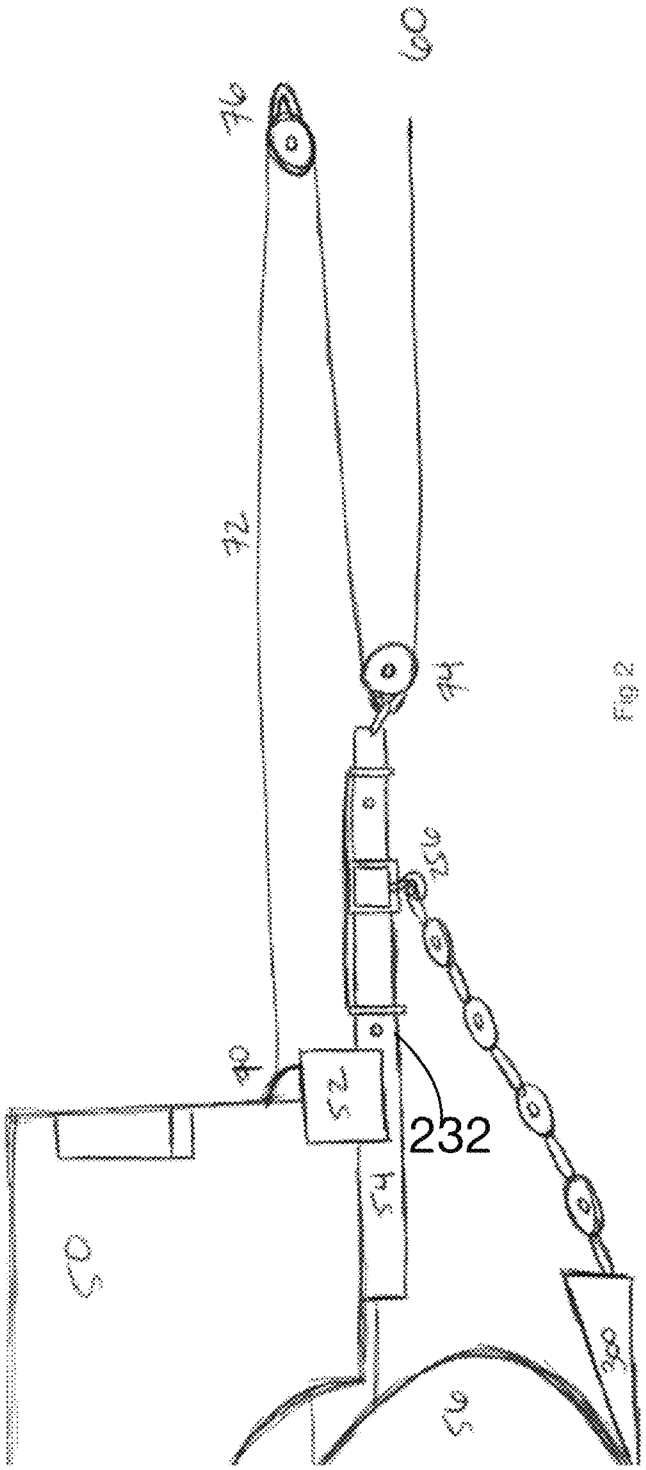
FIG. 2 is a side view of the winch stabilizer assembly of FIG. 1.

FIG. 2 is a side view of the winch stabilizer assembly 100 of FIG. 1. The winch stabilizer assembly attaches to the square receiver hitch connection 232 and pinning system, and is secured with receiver pin 234 (not shown). When the assembly is fully installed and assembled appropriately, the winch 70 (whether bumper mounted or attached in place of the moveable snatch block 74 location) will pull the winching vehicle 50 (winching vehicle needs to be in neutral to prevent transmission damage) back onto the tire anchors 300 and 301. The vehicle is properly positioned on top of both tire anchors, and the lengths of the tire anchor chains are adjusted to remove most slack. The weight of the vehicle coupled with the winching force will anchor the winching vehicle to the ground and provide a stable position to winch out a vehicle 60 in need of recovery.

Figure 3A:
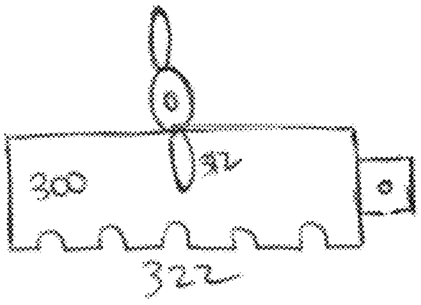
FIG. 3A is a front view of the right tire anchor of the winch stabilizer assembly of FIG. 1.
Figure 3B:
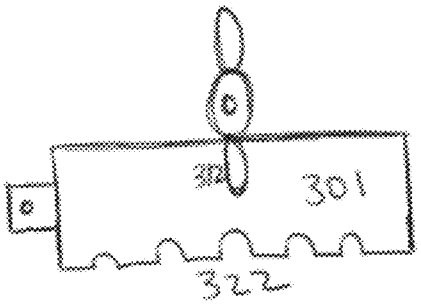
FIG. 3B is a front view of the left tire anchor of the winch stabilizer assembly of FIG. 1.

FIGS. 3A and 3B are front views of an embodiment of tire anchors 300 and 301 of the winch stabilizer assembly 100 of FIG. 1.

Figure 4A:
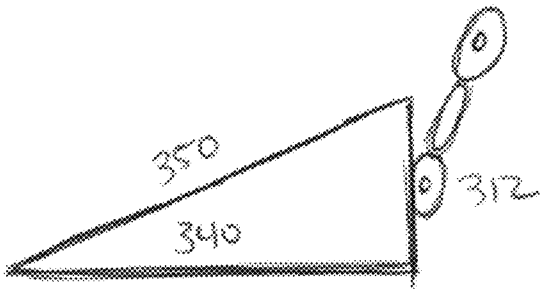
FIG. 4A is a side view of the right tire anchor of the winch stabilizer assembly of FIG. 1
Figure 4B:
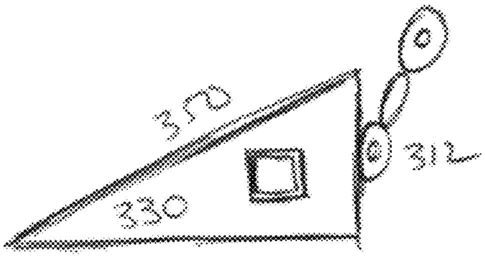
FIG. 4B is a side view of the left tire anchor of the winch stabilizer assembly of FIG. 1

FIGS. 4A and 4B are side views of tire anchors 300 and 301 of the winch stabilizer assembly 100 of FIG. 1.

Figure 5A:
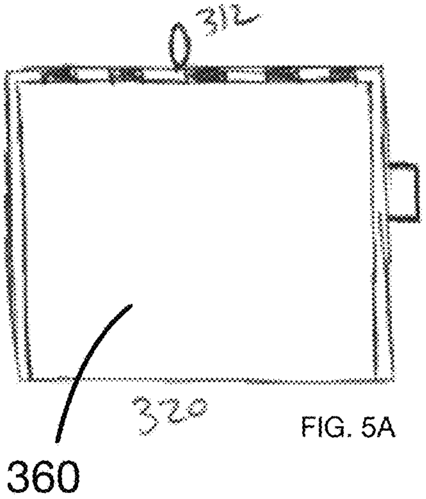
FIG. 5A is a bottom view of the right tire anchor of the winch stabilizer assembly of FIG. 1
Figure 5B:
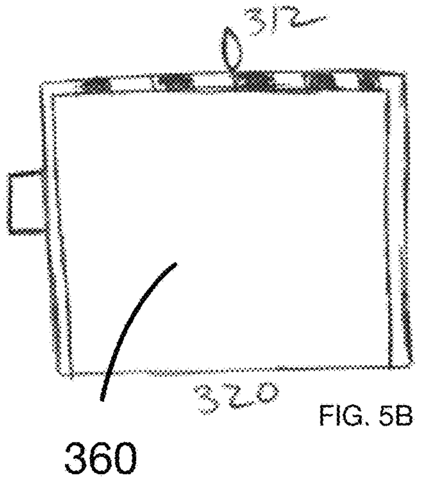
FIG. 5B is a bottom view of the right tire anchor of the winch stabilizer assembly of FIG. 1

FIGS. 5A and 5B are bottom views of tire anchors 300 and 301 of the winch stabilizer assembly 100 of FIG. 1

In this example, the tire anchors 300 and 301 utilize notches 322 and hollow interior 360 to dig into the surface to provide the stabile anchor point from which to winch out the vehicle in need of recovery 60. In this example, chain 312 is welded onto each tire anchor will allow for modular adjustment to fit the different height of the vehicle 50 providing the winching. The tire anchors can be pinned in place of the extension arms via the square tubing mounted to the side 334 of the tire anchors via pin 512.

Figure 6:
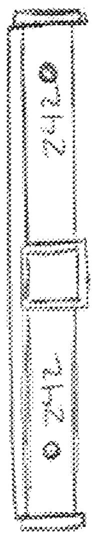
FIG. 6 is a or front view of the extension plate of the winch stabilizer assembly of FIG. 1

FIG. 6 is a front view (looking at the vehicle) of the extension plate 200 of the winch stabilizer assembly 100 of FIG. 1. These figures illustrate orientation and how the extension plate 210 and cross bracing 220 will interact with the winching vehicle 50 via receiver hitch pinning system.

Figure 7:
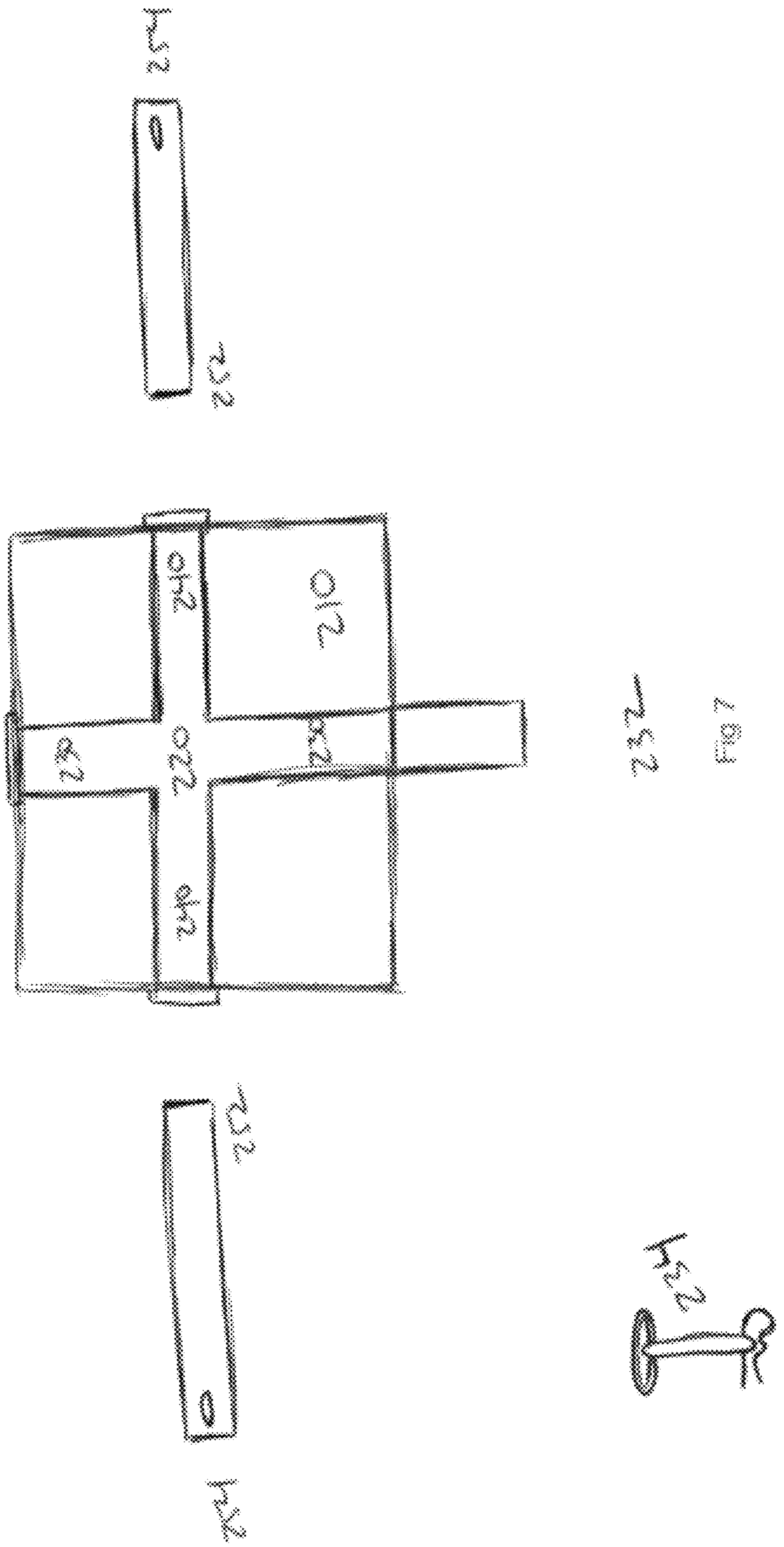
FIG. 7 is a bottom view of the extension plate of the winch stabilizer assembly of FIG. 1.

FIG. 7 is a bottom view of the extension plate 200 of the winch stabilizer assembly 100 of FIG. 1. The cross bracing 220 in the extension plate is crucial for the functionality of the tire anchors 300 and 301 and provides the basis for the overall winching success. This figure shows the pin holes 234 for the extension arms 250 and 251 to pin into place and allows the tire anchors 300 and 301 to properly engage with the surface by locking the tire anchors into place with the winch stabilizing system as an entire unit.

Figure 8A:
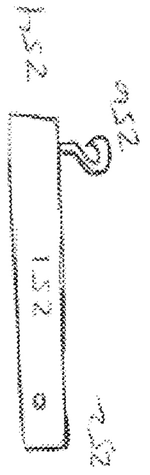
FIG. 8A is a front view of the right extension arm of the winch stabilizer assembly of FIG. 1.
Figure 8B:
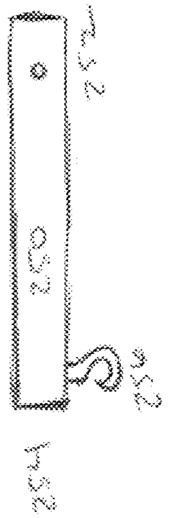
FIG. 8B is a front view of the left extension arm of the winch stabilizer assembly of FIG. 1.

FIGS. 8A and 8B are front views of the right extension arm and left extension arms. The extension arms orientation can be seen in FIG. 8 via the distal 254 and proximal 252 locations and how they interface with the entire crossmember assembly. The chain hooks 256 allow for modularity of the length needed to accommodate different heights and sizes of vehicle 50 providing the winching recovery.

Figure 9:
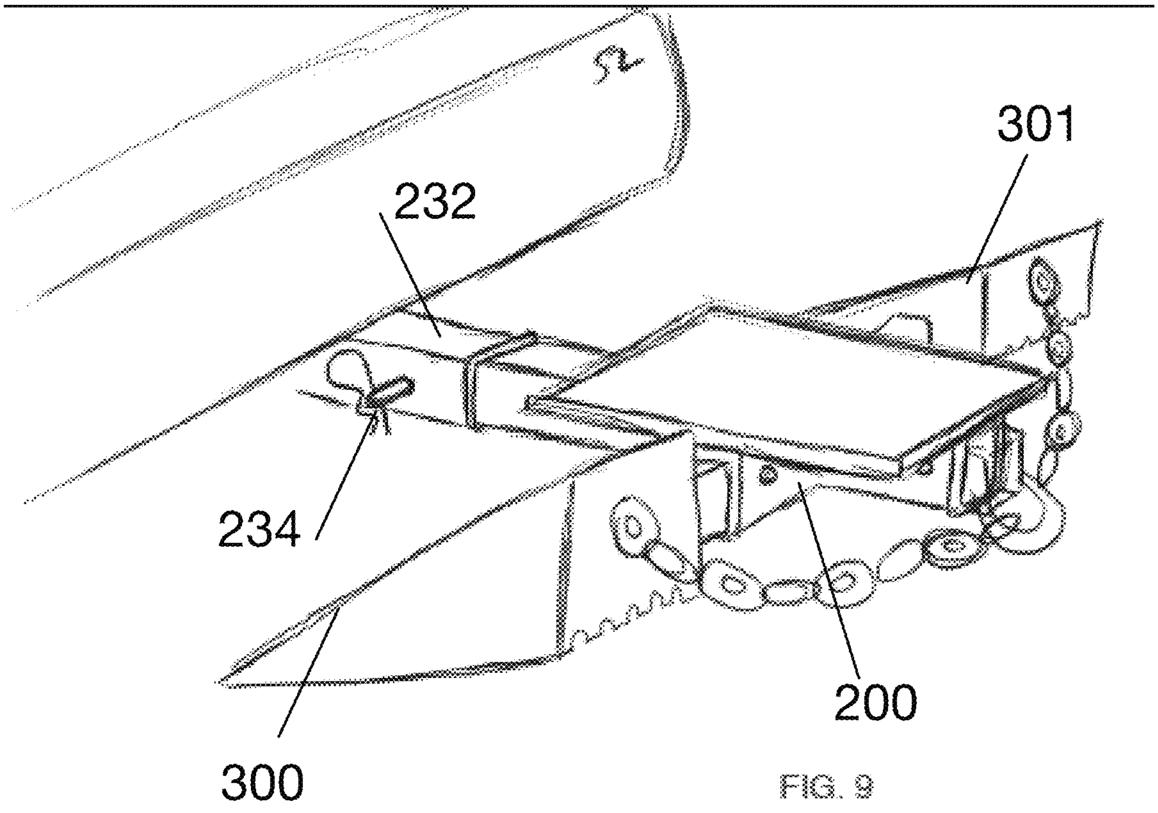
FIG. 9 is a rear perspective view of the winch stabilizer assembly of FIG. 1.

FIG. 9 is a rear perspective view of the winch stabilizer assembly of FIG. 1 configured for transport with the tire anchors supported by the extension plate.

Method of Use

In an example method of use, the winch stabilizer assembly 100 is configured for transport, transported to a recovery site, and then configured for recovery.

Installation for transportation configuration:

Pin the cross-bracing extension plate 220 into the receiver hitch of a vehicle.

Pin each tire anchor 300 and 301 into the lateral receiver tubes 240, connecting the chains on each tire anchor to a D ring shackle 55 placed in the receiver hitch mount 54 on the longitudinal receiver hitch used for moveable snatch block placement upon deployment.

Place the extension tubes 250 and 251 inside the vehicle during transport.

Deployment for installation for recovery configuration:

Unpin each tire anchor 300 and 301 from the lateral receiver tubes 240 and place them behind the rear tires 56 to where the lower edge of the tire anchors are touching the back of the tires. The notches 322 and welded chain 312 should be facing away from the rear tires, thus allowing the tires to roll back onto the tire anchors once the setup is complete and the winch begins to engage the recovered vehicle or object 60.

Remove the extension tubes 250 and 251 from the vehicle and pin them in the lateral receiver tubes 240 on each side of the extension plate assembly 200.

Engage the welded chain 312 with the hooks 256 on each extension tube 205 and 251. This allows for modularity in deployment between various sized vehicles utilizing the winch stabilizing system assembly.

Pin a D ring shackle into the hitch for a moveable snatch block 74 to be installed depending on the severity of the situation to recover the recovery vehicle 60.

Rig up the winch line as needed for the situation and begin to engage the winch.

The vehicle 50 performing the recovery will need to be in neutral to roll backwards as the winch is pulling tight to the recovered vehicle or object 60.

As the vehicle performing the recovery 50 is rolled backwards onto the tire anchors 300 and 301, the chain will become taught and the resultant force will engage the weight of the vehicle through the tire anchors and into the ground or support surface.

As the winch is engaged, the tire anchors will stabilize position and provide a stable location from which to recover the recovery vehicle 60.

When the Recovered vehicle or object 60 is extracted, the winch line 72 is spooled up, and vehicle performing recovery 50 can be driven forward with chains still attached to extension tubes 250 and 251 to easily remove the tire anchors 300 and 301 from the ground or support surface.

Prep the winch stabilizing assembly back to the transportation configuration.

It is to be understood that the specific embodiments and examples described above are by way of illustration, and not limitation. Various modifications may be made by one of ordinary skill, and the scope of the invention is as defined in the appended claims.

What is claimed is:

1. A winch stabilizer assembly for stabilizing a vehicle bumper-mounted winch, the winch stabilizer assembly comprising

- a first extension arm and a second extension arm, each arm comprising
  - a proximal end portion, and
  - a distal end portion with a chain hook;
- an extension plate configured to be removable mounted to a vehicle rear hitch, the extension plate comprising
  - a top plate,
  - a cross brace comprising
    - a longitudinal bar comprising
      - a vehicle receiver hitch connection, and
    - a lateral bar comprising
      - a first end with an extension receiver configured to accept the proximal end of the first extension arm, and
      - a second end with an extension receiver configured to accept the proximal end of the second extension arm, and
  - a pair of tire anchors, each tire anchor comprising
    - a tire anchor chain comprising
      - a proximal first end, and
      - a distal end with a hook,
    - a rear plate comprising
      - a welded first end of the tire anchor chain or a chain connection element configured to attach the proximal first end of the tire anchor chain, and
      - a notched bottom edge,
    - an inside plate comprising
      - an extension plate attachment element,
  - an outside plate, and
  - a top plate.

2. A method for stabilizing a vehicle bumper-mounted winch on a winching vehicle having a rear hitch and a pair of rear tires, the method comprising providing a winch stabilizer assembly comprising
a first extension arm and a second extension arm, each arm comprising
a proximal end portion, and
a distal end portion with a chain hook;
an extension plate configured to be removable mounted to a vehicle rear hitch, the extension plate comprising
a top plate,
a cross brace comprising
a longitudinal bar comprising
a vehicle receiver hitch connection, and
a lateral bar comprising
a first end with an extension receiver configured to accept the proximal end of the first extension arm, and
a second end with an extension receiver configured to accept the proximal end of the second extension arm, and
a pair of tire anchors, each tire anchor comprising
a tire anchor chain comprising a proximal first end, and
a distal end with a hook,
a rear plate comprising
a welded first end of the tire anchor chain or a chain connection element configured to attach the proximal first end of the tire anchor chain, and
a notched bottom edge,
an inside plate comprising
an extension plate attachment element,
an outside plate, and
a top plate;
positioning the pair of tire anchors behind the rear tires of the winching vehicle;
attaching the extension plate to the winching vehicle rear hitch;
inserting the first and second end extension arms into the extension plate; and
attaching the second end hooks of the tire anchor chains to the respective extension arms.

* * * * *